United States Patent
Leimkoetter

(10) Patent No.: US 6,628,319 B2
(45) Date of Patent: Sep. 30, 2003

(54) METHOD AND MULTIMEDIA COMMUNICATION DEVICE FOR ENABLING COMMUNICATION BETWEEN TERMINALS HAVING DIFFERENT MULTIMEDIA CAPABILITIES

(75) Inventor: Ulrich Leimkoetter, Gelsenikirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/898,367

(22) Filed: Jul. 3, 2001

(65) Prior Publication Data

US 2002/0044200 A1 Apr. 18, 2002

(30) Foreign Application Priority Data

Jul. 5, 2000 (DE) .......................................... 100 32 521

(51) Int. Cl.$^7$ ................................................. H04N 7/14
(52) U.S. Cl. ................................ 348/14.01; 348/14.08; 348/14.11
(58) Field of Search ........................... 348/14.01, 14.02, 348/14.03, 14.04, 14.05, 14.07, 14.08, 14.09, 14.11; 379/93.05, 93.08, 93.09, 110.01; H04N 7/14

(56) References Cited

U.S. PATENT DOCUMENTS 6,020,915 A * 2/2000 Bruno et al. ............. 348/14.09

FOREIGN PATENT DOCUMENTS

JP 407264298 A * 10/1995 ............. H04M/3/42

* cited by examiner

*Primary Examiner*—Melur Ramakrishnaiah
(74) *Attorney, Agent, or Firm*—Bell, Boyd & Lloyd LLC

(57) ABSTRACT

For communication between terminals having different multimedia capabilities, those multimedia services are determined which, although they are offered by a first of the terminals, they are not operated by a second of the terminals. For a multimedia service determined in this way, multimedia data specific to this multimedia service are thereupon selected from a multiplicity of stored multimedia data and transmitted to the first terminal. In this case, the transmission is effected via a media channel, which is assigned to a connection between first and second terminal.

8 Claims, 1 Drawing Sheet

METHOD AND MULTIMEDIA COMMUNICATION DEVICE FOR ENABLING COMMUNICATION BETWEEN TERMINALS HAVING DIFFERENT MULTIMEDIA CAPABILITIES

BACKGROUND OF THE INVENTION

1. Field of the Invention

The present invention relates to a method and multimedia communication device for enabling communication between terminals having different multimedia capabilities and, more specifically, to such a method and device wherein for multimedia services which are offered by only one of the terminals, the multimedia services are supplied with stored, multimedia-service-specific multimedia data which are transmitted to the terminal offering the respective multimedia service such that the stored multimedia data allow for an individually confirgurable reaction with respect to the terminals having the different multimedia capabilities.

2. Description of the Prior Art

Multimedia-enabled terminals are being used to an increasing extent in contemporary communication systems. Terminals of this type support one or a number of different multimedia services which allow multimedia communication via different media channels. Examples of multimedia services of this type are voice services, audio services, video services, information services, data services and program communication services. The different multimedia services are generally accessed with the aid of specific communication protocols.

To date, in order to utilize a predetermined multimedia service in a communication-specific manner in the context of communication between two terminals, it has been necessary for both terminals to support the relevant multimedia service. Consequently, in the event of communication between terminals having different multimedia capabilities, one or more of the multimedia capabilities of the terminals are not utilized in a communication-specific manner.

It is an object of the present invention, therefore, to specify a method and a multimedia communication device for communication between terminals having different multimedia capabilities, which allow improved utilization of the multimedia capabilities of the terminals.

SUMMARY OF THE INVENTION

According, the present invention makes it possible, in the event of connections between terminals having different multimedia capabilities, for multimedia services which are offered by a first terminal to be utilized in a communication-specific manner even when these multimedia services are not operated by a connection partner of the first terminal. Instead of termination, without replacement, of multimedia services that are offered but not operated, according to the present invention these multimedia services are supplied with stored, multimedia-service-specific multimedia data which are transmitted to the terminal offering the relevant multimedia service. In principle, the stored multimedia data, which can be transmitted as required, can be predetermined as desired and, thus, allow an individually configurable or programmable reaction with respect to terminals having very different multimedia capabilities. In this way, it is possible, e.g. for a user who is often connected to terminals having different multimedia capabilities, to achieve a uniform, configurable appearance in the context of the different multimedia services supported by his communication partners.

In accordance with one embodiment of the present invention, user-specific multimedia data can be stored, from which the multimedia data to be communicated to the first terminal are selected in a manner dependent on a user determined. Thus, for example, for different users it is possible to store different video data with a still image of the relevant user. A stored still image of the respectively called user is then communicated to each calling video-enabled terminal.

Furthermore, performance-feature-specific and/or terminal-specific and/or group-specific multimedia data also can be stored. In these cases, the multimedia data to be communicated to the first terminal can be selected in a manner dependent on an activated performance feature and/or an identity of a terminal and/or an association of a terminal with a terminal group.

The selection and communication of the multimedia data can be effected fairly easily via a user-individually and/or performance-feature-individually predetermined reaction matrix. In such a reaction matrix, items of control information for controlling the selection and transmission of the multimedia data are stored, in each case, in a differentiated manner according to potential multimedia capabilities of the communicating terminals.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
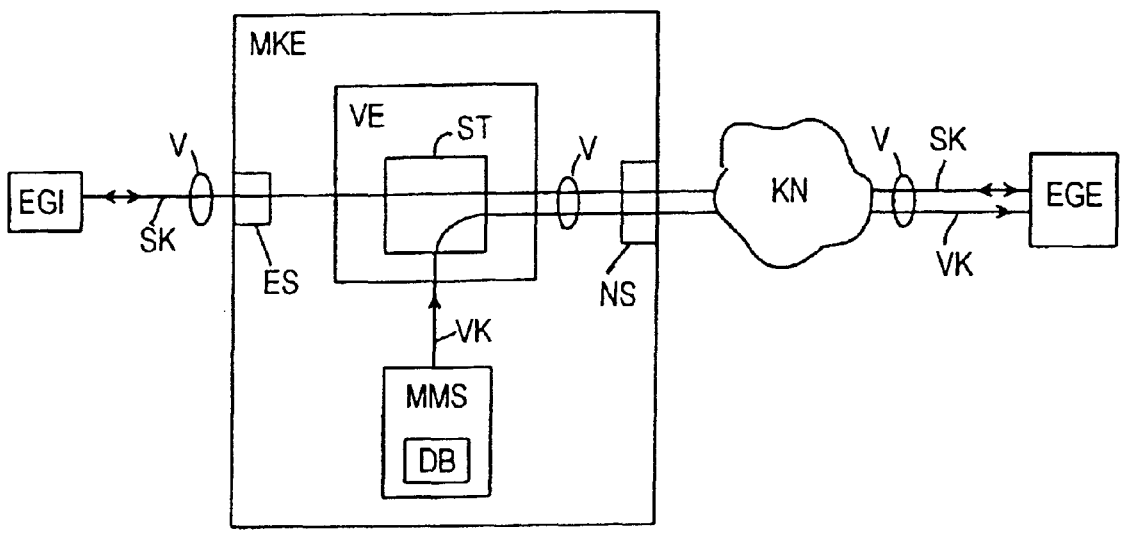
FIG. 1 shows a multimedia communication device with a directly coupled terminal and a terminal coupled via a communication network.

FIG. 1 diagrammatically illustrates a multimedia communication device MKE (e.g., a private branch exchange), coupled to a communication network KN via a network interface NS. A voice-communication-enabled terminal EGI is coupled to the multimedia communication device MKE via a terminal interface ES thereof. As the terminal directly coupled to the multimedia device MKE, the terminal EGI is also designated as internal terminal below. The internal terminal EGI also can be a cordless or mobile terminal. In this case, an air interface is implemented by the terminal interface ES.

Furthermore, a voice- and video-communication-enabled external terminal EGE is connected to the communication network KN. Between the external terminal EGE and the internal terminal EGI, a connection V is set up via the communication network KN and the multimedia communication device MKE.

The multimedia communication device MKE contains as further functional components a switching device VE with a controller ST, and a multimedia server MMS with a database DB. A multiplicity of multimedia protocols for providing a multiplicity of multimedia services, such as voice services, audio services, video services, information services, data services or control services, are implemented in the multimedia server MMS. In the database DB of the multimedia server MMS, individually predeterminable, multimedia-server-specific multimedia data are correspondingly stored for each multimedia service supported by the multimedia server. Instead of the individual internal database DB, a number of multimedia-service-specific databases, external databases or other data sources also could be provided.

Each supported multimedia service or multimedia protocol is assigned one or a number of multimedia channels for transmission of the respectively specific multimedia data. In the present exemplary embodiment, in the context of the connection V, there is set up a voice channel SK switched by both the switching device VE and the controller ST and serving for the bidirectional transport of voice data between the terminals EGI and EGE. Furthermore, a video channel VK is set up which, proceeding from the multimedia server MMS, is assigned by the switching device VE and the controller ST to the connection V and is switched via the communication network KN to the terminal EGE. Video data stored in the database DB are transmitted via the video channel VK for display on the terminal EGE. As a result of the assignment of the video channel VK to the connection V, the terminal EGE is given the fake impression that the transmitted video data originate from the terminal EGI.

It should be noted at this point that the connection V, as illustrated in FIG. 1, between a voice-communication-enabled terminal EGI and a voice- and video-communication-enabled terminal EGE is to be understood as being merely an example. In principle, the present invention is largely independent of the number of communicating terminals and the specific multimedia capabilities thereof. Thus, the present invention can, for example, be analogously applied to conference circuits between three or more terminals having any desired different multimedia capabilities. Furthermore, any desired communication terminals, such as fixed network terminals, cordless terminals, mobile terminals and/or personal computers, can be utilized as terminals.

Figure 2:
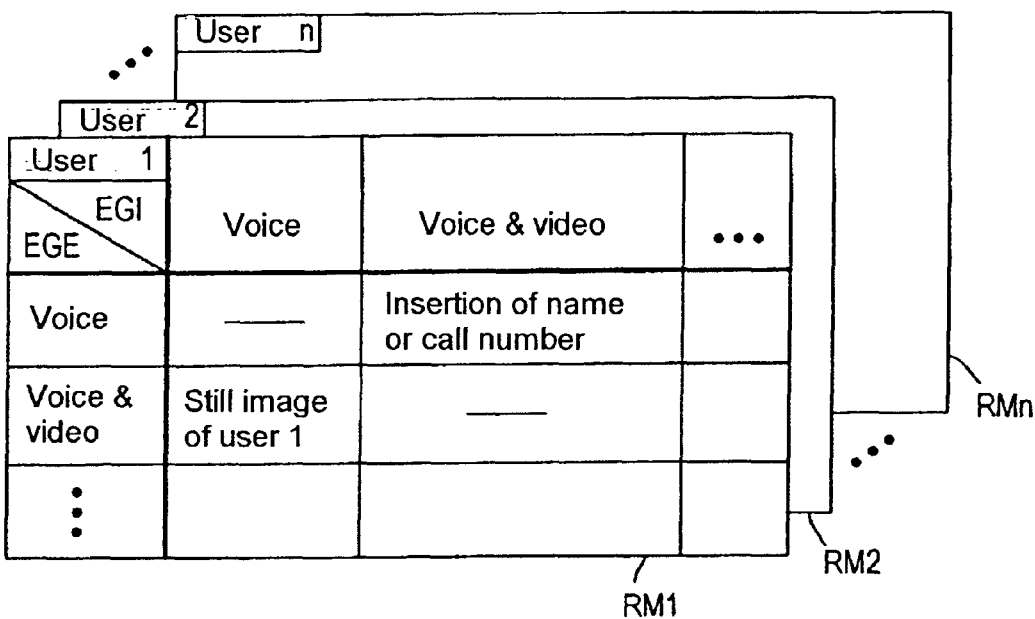
FIG. 2 shows a set of user-individual reaction matrices.

FIG. 2 diagrammatically illustrates a set of user-individual reaction matrices RM1, RM2, . . . , RMn, whose data structure is stored in the controller ST. Each reaction matrix RM1, RM2, . . . , RMn is unambiguously assigned to a respective user 1, 2, . . . , n and is user-individually configurable. Respective items of control information for controlling the multimedia server MMS and the switching device VE are stored in the fields of the reaction matrices RM1, . . . , RMn organized in rows and columns. A reaction matrix RM1, . . . , RMn receives, in each case, a dedicated row for a multiplicity of possible multimedia capabilities from external terminals EGE and also a dedicated column for a multiplicity of possible multimedia capabilities from internal terminals EGI. For reasons of clarity, FIG. 2 of the present exemplary embodiment explicitly illustrates just the rows and columns for only voice-communication-enabled terminals ("voice") and both voice- and video-communication-enabled terminals ("voice & video"). In practice, further rows and/or columns may be provided in the reaction matrices RM1, . . . , RMn in order, for example, to take account of multimedia terminals providing data services, information services and/or control services. The items of control information stored in the fields of the reaction matrices RM1, . . . , RMn define, in a user-individual manner, how the multimedia communication device MKE reacts if a connection is to be set up between multimedia terminals having different multimedia capabilities. In this case, the items of control information relate to the media channels relevant to the respective multimedia terminals.

In the present exemplary embodiment, when the connection V is set up between the internal terminal EGI and the external terminal EGE, via the controller ST, there are determined the multimedia capabilities of the terminals EGI and EGE participating in the connection V, and the type of multimedia services respectively offered by the terminals; a voice service in the case of the terminal EGI and both a voice service and a video service in the case of the terminal EGE. Furthermore, the instantaneous user of the internal terminal EGI, in this case user 1, is determined. In accordance with the ascertained identity of the user of the internal terminal EGI, the reaction matrix RM1 assigned to the user 1 is selected by the controller ST.

If the terminals to be connected have the same multimedia capabilities, no measures over and above the setting-up of a connection are provided—as indicated by omission dashes in the diagonal fields of the reaction matrix RM1 in FIG. 2. If, by contrast, as in the present exemplary embodiment, the controller ST ascertains that one of the terminals to be connected, in this case EGE, offers a multimedia service which is not operated by another terminal, in this case EGI, the multimedia server MMS is activated. Such multimedia channels which are offered by one terminal and are not operated by a further terminal connected thereto are also designated as "open ends" below. In the present exemplary embodiment, the video channel VK, which is offered by the terminal EGE but is not operated by the terminal EGI, forms such an open end.

In order to set up the connection V, via the controller ST, the terminals EGI and EGE are firstly connected through the voice channel SK offered by both terminals. In order to specifically operate the open video channel VK of the terminal EGE, the controller ST reads out from the selected reaction matrix RM1 an item of control information from that field which corresponds to the multimedia services respectively offered by the terminals EGI and EGE. In the present exemplary embodiment, this is an item of control information for displaying a still image of the user 1. The item of control information read out defines the further reaction for the multimedia communication device MKE.

The item of control information read out causes the multimedia server MMS to fetch video data representing a still image of the user 1 from the database DB and to transmit them to the switching device VE. The switching device VE thereupon transmits the video data received from the multimedia server MMS, the video data containing the still image of the user 1, within the video channel VK assigned to the connection V that has been set up, to the terminal EGE. As a result, a user of the external terminal EGE, during his voice communication with user 1, sees the latter's still image.

For each further user of the users 1 to n, in the database DB there are likewise stored multimedia data containing a respective still image of the relevant user for display on video-enabled terminals. In addition, or as an alternative, in the database DB there may also be stored user-individual visiting cards or a uniform company logo, or one differentiated according to individual departments, for display on video-enabled terminals of communication partners. In this way, internal users of the multimedia communication device MKE can be provided with a uniform appearance in sound, text and image in the context of very different multimedia services and/or a uniform multimedia-enabled interface with respect to external communication partners. In principle, the reaction to open media channels in the reaction matrices RM1, . . . , RMn and the corresponding multimedia data in the database DB can be configured as desired. The present invention thus makes it possible to react individually to open media channels, instead of outputting an error message or terminating the open media channels without replacement—as has been in the prior art.

In the reaction matrix RM1, a further entry is provided for cases in which the internal terminal EGI is both voice- and video-enabled and the external terminal EGE is only voice-enabled. In these cases, because of the lack of a video image of the user of the external terminal EGE, the corresponding item of control information stored in the reaction matrix RM1 causes the name and/or the call number of the user, if known, to be inserted as an image on the terminal EGI.

In accordance with a further embodiment of the present invention, it is also possible to provide performance-feature-specific or terminal-specific reaction matrices or reaction matrices specific to predetermined groups of terminals. Thus, a dedicated reaction matrix may, in each case, be stored for example for different performance features of the multimedia communication device MKE in the controller ST. The performance-feature-specific control information contained therein has the effect of causing, in the event of a relevant performance feature being initiated, a performance-feature-specific reaction of the communication system in a manner dependent on the multimedia capabilities of the participating terminals. In this way, such as in a video conference circuit, in the event of the performance feature "do not disturb" being initiated by a video conference subscriber, some or all of the multimedia channels assigned to a connection to this subscriber may be supplied by the multimedia server MMS in order to display a still image specific to this performance feature for the remaining conference subscribers.

Although the present invention has been described with reference to specific embodiments, those of skill in the art will recognize that changes may be made thereto without departing from the spirit an scope of the invention as set forth in the hereafter appended claims.

I claim as my invention:

1. A method for enabling communication between first and second terminals having respectively different multimedia capabilities, the method comprising the steps of:

ascertaining what multimedia services are respectively offered by the first and second terminals;

determining a multimedia service which is offered by the first terminal and not offered by the second terminal;

selecting multimedia data specific to the determined multimedia service, in a manner dependent on the determined multimedia service, from a plurality of predetermined, stored multimedia data; and transmitting the selected multimedia data to the first terminal via a media channel which is assigned to a connection between the first and second terminals.

2. A method for enabling communication between first and second terminals having respectively different multimedia capabilities as claimed in claim 1, the method further comprising the step of:

determining a respective user for at least one of the first and second terminals, wherein the multimedia data are selected from a plurality of stored, user-specific multimedia data in a manner dependent on the determined user.

3. A method for enabling communication between first and second terminals having respectively different multimedia capabilities as claimed in claim 1, wherein the multimedia data are selected from a plurality of stored, performance-feature-specific multimedia data in a manner dependent on a performance feature activated at at least one of the first and second terminals.

4. A method for enabling communication between first and second terminals having respectively different multimedia capabilities as claimed in claim 1, the method further comprising the step of:

determining an identity of at least one of the first and second terminals, wherein the multimedia data are selected from a plurality of stored, terminal-specific multimedia data in a manner dependent on the determined identity.

5. A method for enabling communication between first and second terminals having respectively different multimedia capabilities as claimed in claim 1, the method further comprising the step of:

determining a group association of at least one of the first and second terminals, wherein the multimedia data are selected from a plurality of stored, group-specific multimedia data in a manner dependent on the determined group association.

6. A multimedia communication device for enabling communication between first and second terminals having respectively different multimedia capabilities, comprising:

an acquisition device for determining a multimedia service which is offered by the first terminal and not offered by the second terminal;

a storage part for storing predetermined multimedia data;

a server device for interrogating the multimedia data from the storage part, the multimedia data being specific to the determined multimedia service, and for outputting the multimedia data; and a switching device for transmitting the output multimedia data via a multimedia-service-specific media channel to the first terminal and for assigning the media channel to a connection between the first and second terminals.

7. A multimedia communication device for enabling communication between first and second terminals as claimed in claim 6, further comprising:

a user-individually confirgurable reaction matrix which is predetermined for each user and in which a respective item of control information for controlling the server device is stored in a differentiated manner, both according to potential multimedia capabilities of one of the first and second terminals to be used by the respective user and according to potential multimedia capabilities of the other of the first and second terminals to be connected to the former terminal.

8. A multimedia communication device for enabling communication between first and second terminals as claimed in claim 6, further comprising:

a performance-feature-individually configurable reaction matrix which is predetermined in each case for different performance features and in which a respective item of control information for controlling the respective performance feature is stored in a differentiated manner both according to potential multimedia capabilities of a calling terminal of the first and second terminals and according to potential multimedia capabilities of the other of the first and second terminals called by the former terminal.

* * * * *